UNITED STATES PATENT OFFICE.

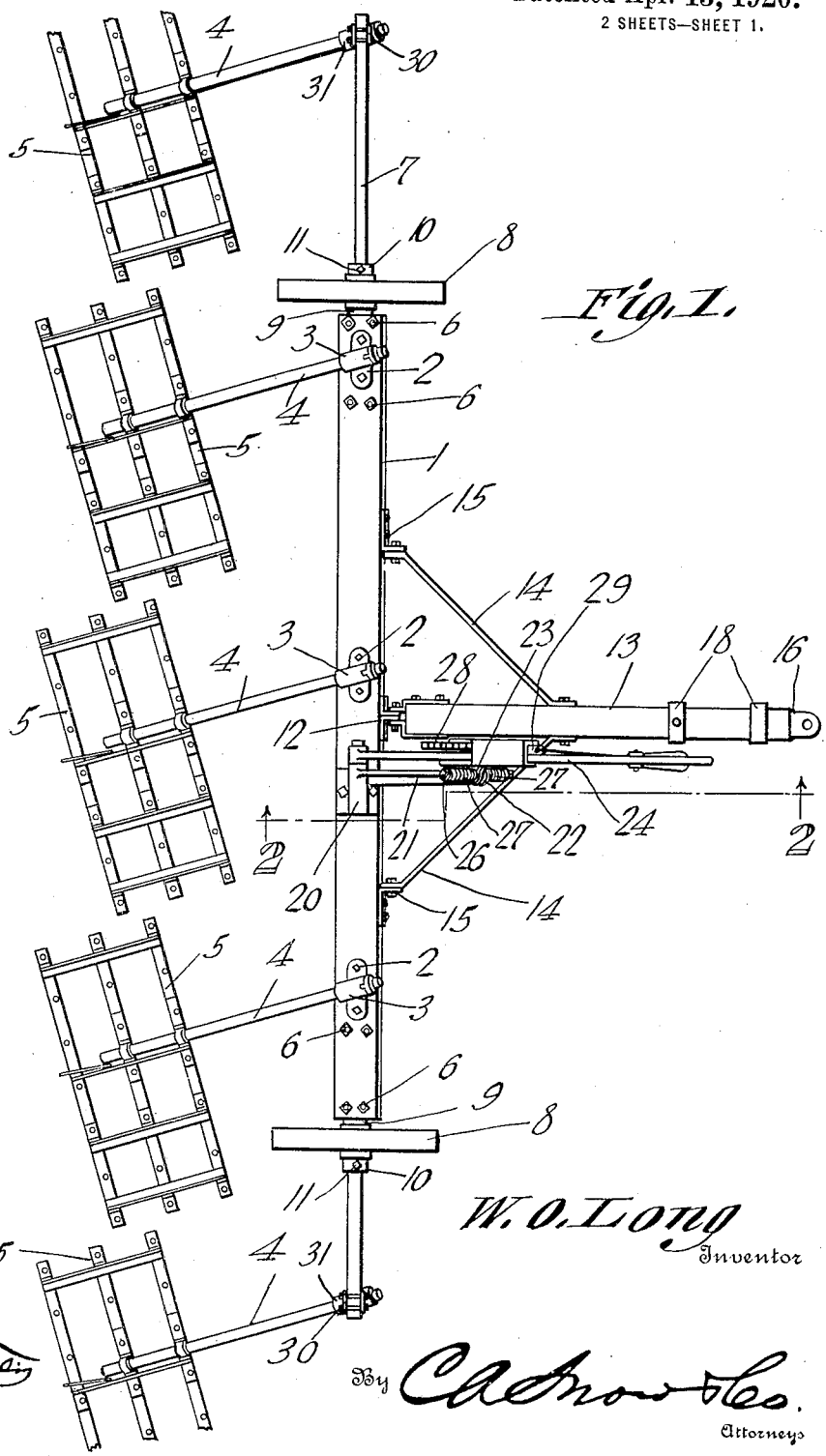

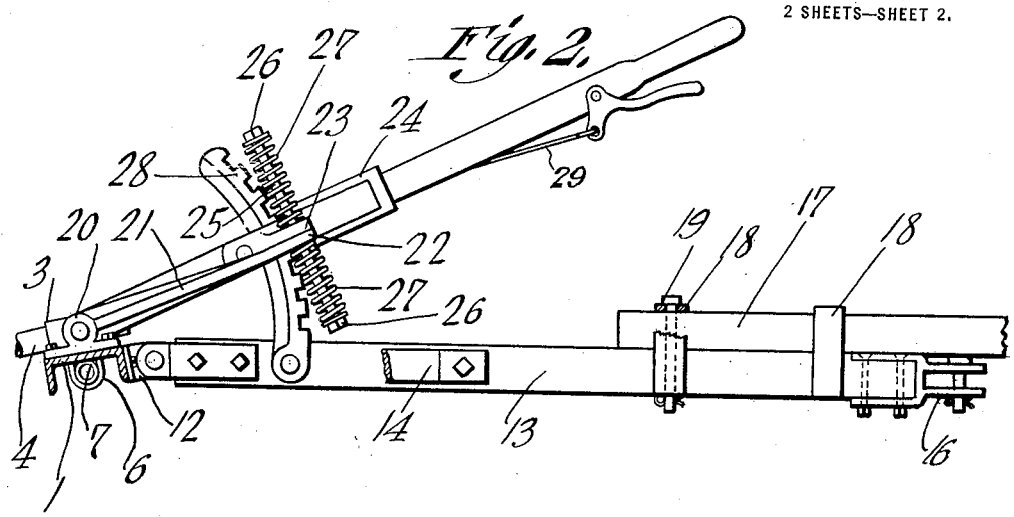
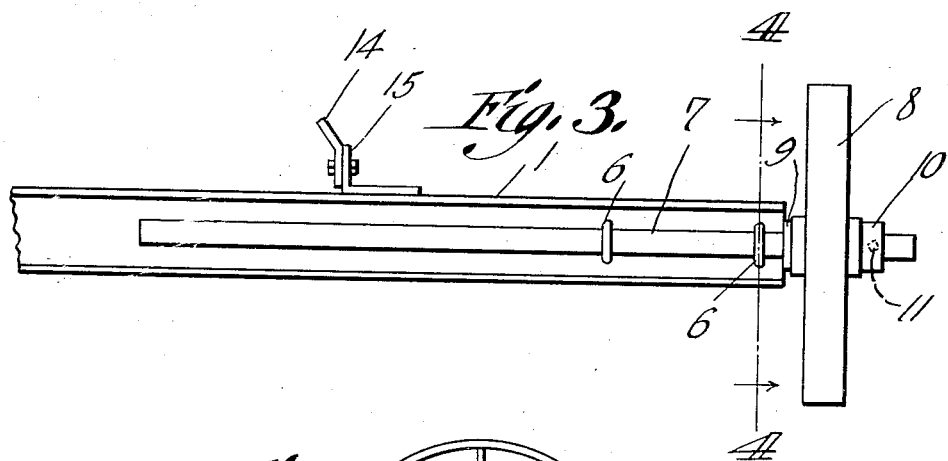
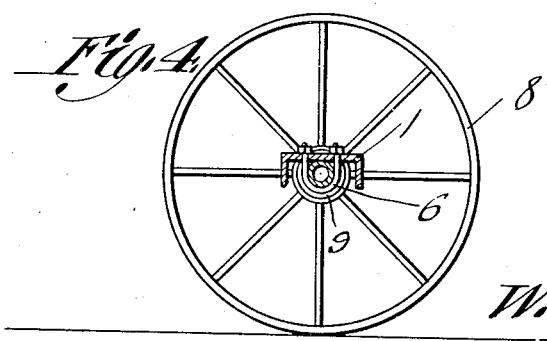

WILLARD O. LONG, OF MANSFIELD, OHIO.

HARROW.

1,336,642.  Specification of Letters Patent.  Patented Apr. 13, 1920.

Application filed July 7, 1919. Serial No. 309,139.

*To all whom it may concern:*

Be it known that I, WILLARD O. LONG, a citizen of the United States, residing at Mansfield, in the county of Richland and State of Ohio, have invented a new and useful Harrow, of which the following is a specification.

This invention relates to harrows and more especially to a wheel supported structure whereby a plurality of harrows such as shown, for example, in my Patent 1,314,678, issued Sept. 2, 1919, may be connected and drawn behind draft animals or a tractor.

One of the objects of the invention is to provide a simple form of beam to which are attached means for connecting the draw bars of the harrows to the beam, said beam being constructed to partly house longitudinally adjustable axles on which the supporting wheels are mounted and which axles, when in extended positions, can be used as means for connecting additional harrows to the beam.

A still further object is to provide simple and efficient means under the control of the driver whereby the beam can be tilted readily to raise or lower the harrows simultaneously, said means including a resilient connection whereby the harrows are pressed yieldingly against the soil while in use.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the claims.

In the accompanying drawing the preferred form of the invention has been shown. In said drawing—

Figure 1 is a plan view of a harrow arranged for use with a tractor and having the present improvements.

Fig. 2 is a section on line 2—2, Fig. 1.

Fig. 3 is a bottom plan view of one end portion of the beam and showing the axle retracted into said beam.

Fig. 4 is a section on line 4—4, Fig. 3, in erect position.

Referring to the figures by characters of reference, 1 designates a channeled beam on which, at regular intervals, are secured brackets 2 having integral sleeves 3 adapted to receive the arms or draw bars 4 of harrow units 5. The arms or bars 4, the means for attaching them to the brackets, and the harrow units constitute, in themselves, no part of the present invention but have already been described and claimed in my patent hereinbefore mentioned and in my other copending applications Numbers 266,837 and 309,138. It will suffice to say that the arms or bars 4 are extended diagonally from the beam at an angle of about 16° and are parallel.

Arranged within each end portion of the channeled beam 1 are U-bolts 6 preferably though not necessarily arranged in pairs, the bolts at each end of the beam straddling an axle 7 which can be a length of pipe and which can be shifted longitudinally relative to the beam and then secured by tightening the U-bolts. Mounted on the projection portion of each axle 7 is a supporting wheel 8, there being a wear ring 9 interposed between each wheel and the beam 1 and an adjustable collar on each axle and at the outer side of the wheel, as shown at 10. The collars 10 are held by set screws 11 or the like and can be easily loosened and adjusted.

Secured to the front of the beam 1 at the center thereof is a bracket 12 to which is hinged a short draft tongue 13. Rearwardly diverging braces 14 are secured to the sides of this tongue and are pivotally connected, at their rear ends to brackets 15 secured to the front of the beam 1. Tongue 13 has a clevis 16 at its front end whereby it can be connected readily to a tractor. If draft animals are to be used for pulling the harrow, a supplemental tongue 17 may be mounted on the tongue 13 so as to project forwardly therefrom, this tongue 17 being extended through loops 18 on the tongue 13 and held in place by a pin 19.

Fixedly secured on the beam 1 is a bracket 20 having an arm 21 extending forwardly therefrom. This arm has an eye 22 extending under a lug 23 outstanding from one side of a hand lever 24 which is pivotally connected to one side of the bracket 20 and extends forwardly to a point where it can be reached conveniently by the user. A rod 25 extends loosely through the lug 23 and the eye 22 and is provided at its ends with nuts, heads or other suitable abutments indicated at 26. Springs 27 are interposed between these abutments and on the rod, one spring bearing downwardly against the lug 23 while the other spring bears upwardly against the eye 22. A toothed segment 28 projects upwardly from the tongue 13 and is adapted to be engaged by a dog 29 carried by the lever 24. Thus it will be seen that, by swinging the lever 24 upwardly the lug 23 will press against the upper spring 27, thereby lifting the rod 25 and causing it to lift, through the lower spring 27, against the eye 22 and swing the arm 21 so as to tilt the beam 1 and swing the harrows downwardly against the soil. While the harrows are thus held (being locked by the segment 28 and dog 29), they are free to lift up against the springs 27 as will be obvious.

When it is desired to use the apparatus in connection with a tractor capable of pulling more than three harrow units, the U-bolts 6 are loosened, the axles are drawn outwardly relative to the beam 1, and then resecured, and the wheels 8 are maintained close to the ends of the beam 1 by adjusting the collars 10 along the axles and against the wheels. On the projecting outer ends of the axles are then placed clamps 30 having sleeves 31 and into these sleeves are placed the arms or draw bars of additional harrow units, as shown in Fig. 1.

What is claimed is:—

1. The combination with a beam, axles connected thereto, and supporting wheels upon the axles, of means on the beam for engaging the draw bars of harrow units, a tongue hingedly connected to the front of the beam, an arm fixedly connected to the beam, a lever hingedly connected thereto, yielding means for transmitting motion from the lever to the arm to tilt the beam and lower the harrow units, and coöperating means upon the lever and tongue for holding the lever against movement relative to the tongue.

2. The combination with a beam, and axles connected thereto, of supporting wheels mounted on said axles, holding means secured to the outer ends of the axles, holding means secured to the beam, harrow units, and draw bars extending from the units and engaged by said holding means.

3. The combination with a channeled beam, of axles seated in the ends of the beam, wheels upon the axles and at the ends of the beams, a tongue hingedly connected to the beam, harrow sections, means for securing said sections to the beam and to the outer ends of the axles to swing upwardly and downwardly with the beam, means for tilting the beam, and coöperating means upon the tongue and said beam tilting means for holding the beam against movement relative to the tongue.

In testimony that I claim the foregoing as my own, I have hereto affixed my signature in the presence of a witness.

WILLARD O. LONG.

Witness:
HERBERT D. LAWSON.